(12) United States Patent
Srinivasan (10) Patent No.: US 11,287,243 B2
(45) Date of Patent: Mar. 29, 2022

(54) DEVICE FOR DETERMINING ORIENTATION OF AN OBJECT

(71) Applicant: Tilak Srinivasan, Bangalore (IN)

(72) Inventor: Tilak Srinivasan, Bangalore (IN)

(*) Notice: Subject to any disclaimer, the term of this patent is extended or adjusted under 35 U.S.C. 154(b) by 47 days.

(21) Appl. No.: 17/046,314

(22) PCT Filed: Apr. 19, 2019

(86) PCT No.: PCT/IB2019/053264
§ 371 (c)(1),
(2) Date: Oct. 9, 2020

(87) PCT Pub. No.: WO2019/202564
PCT Pub. Date: Oct. 24, 2019

(65) Prior Publication Data
US 2021/0095952 A1 Apr. 1, 2021

(30) Foreign Application Priority Data
Apr. 20, 2018 (IN) .............................. 201841013747

(51) Int. Cl.
G01B 11/00 (2006.01)
G01B 11/26 (2006.01)
(Continued)

(52) U.S. Cl.
CPC ............ *G01B 11/002* (2013.01); *G01B 11/14* (2013.01); *G01B 11/26* (2013.01); *G01C 9/00* (2013.01)

(58) Field of Classification Search
CPC ... G01C 9/00; G01C 9/02; G01C 9/06; G01C 9/066; G01C 9/08; G01B 11/00;
(Continued)

(56) References Cited

U.S. PATENT DOCUMENTS 7,672,594 B2 * 3/2010 Mui ................... H04B 10/1143
398/142
10,845,608 B2 * 11/2020 Froula .................... H05H 15/00
(Continued)

FOREIGN PATENT DOCUMENTS

WO    WO-2011004692 A1 *  1/2011  ............. G01B 11/27
WO    WO2018003852 A1     4/2018

OTHER PUBLICATIONS

International Search Report dated Aug. 22, 2019, in the PCT Application No. PCT/IB2019/053264.
(Continued)

*Primary Examiner* — Gordon J Stock, Jr.
(74) *Attorney, Agent, or Firm* — Trupti P. Joshi (57) ABSTRACT

A device (100) for determining orientation of an object (101) is disclosed. The device (100) comprises of a housing (1) configured with a plurality of sensors (4), wherein the plurality of sensors (4) are provided on a surface of the housing. At least one light source (2), is fixed within the housing (1), wherein the at least one light source is configured to emit a continuous light beam (3) on at least one of the plurality of sensors (4) at an initial position (IP) of the object (101). The speed of the continuous light beam emitted by the at least one light source is less than a speed of light. The continuous slow light beam (3) is configured to momentarily impinge on one or more of the plurality of sensors (4) in the same incident ray, when the object (101) is displaced to a displaced position (DP).

10 Claims, 4 Drawing Sheets (51) Int. Cl.
*G01C 9/00* (2006.01)
*G01B 11/14* (2006.01)

(58) Field of Classification Search
CPC ..... G01B 11/002; G01B 11/005; G01B 11/14; G01B 11/26
See application file for complete search history.

(56) References Cited

U.S. PATENT DOCUMENTS

| | | |
|---|---|---|
| 10,897,115 B2 * | 1/2021 | Froula ............... H01S 3/104 |
| 11,047,787 B2 * | 6/2021 | Clayton ............ G01N 15/1404 |
| 2019/0204419 A1 | 7/2019 | Baba |
| 2019/0324171 A1 * | 10/2019 | Alfano ............. G02B 6/2861 |

OTHER PUBLICATIONS

Written Opinion dated Aug. 22, 2019, in the PCT Application No. PCT/IB2019/053264.

* cited by examiner

DEVICE FOR DETERMINING ORIENTATION OF AN OBJECT

CROSS-REFERENCE TO RELATED APPLICATIONS

The present application is a § 371 National Phase entry of International Application No. PCT/IB2019/053264, filed Apr. 19, 2019, which claims priority to Indian Patent Application No. 201841013747, filed Apr. 20, 2018.

TECHNICAL FIELD

The present disclosure relates to an orientation indication device. More particularly, relates to a slow light based orientation indication device for determining orientation of an object.

BACKGROUND OF THE DISCLOSURE

A variety of systems such as aeroplanes, jets and the like employ orientation indication devices such as but not limiting to gyroscopes, gimbal and the like. These measurement systems are used for measuring and indicating orientation of an object under flight. The orientation indication devices may be configured to measure and indicate orientation of the object in 3-dimensional co-ordinates i.e. along X-axis, Y-axis and Z-axis. The orientation indication devices, primarily work based on the measurement and determine of pitch, roll and yaw about each of the 3-dimensional co-ordinates. These measurements and determination of parameters facilitates a user to orient and position the object or the system as per requirement.

Typically, gyroscopes, determine parameters based on the principle of angular momentum. The gyroscopes monitors angular rotation of the object, by taking into account mass and shape of the object, for determining orientation parameters of the object. Further, gyroscopes are of different types based on the different operating principles on which they adapt to, such as the electronic, microchip-packaged MEMS gyroscope devices found in consumer electronic devices, solid-state ring lasers, fibre optic gyroscopes, and the extremely sensitive quantum gyroscope.

However, gyroscopes generally fail to determine orientation parameters of the object, during pan and tilt movements of the object. This effect is pronounced in the gyroscopes, when the object is altering its orientation rapidly. Further, this inaccuracy in measurement is also seen in many of the electronic gadgets, which may be undesirable. Alternatively, gyroscopes need specific parameters such as gravity to be a part of determining the orientation. However, when it comes to objects that are moving in space, this becomes a challenge as standard or conventional gyroscopes fail to provide accurate reading of the orientation of the object travelling in space. Secondly, conventional gyroscopes in many occasions are complex systems that, may not work for objects that are travelling at a fast rate or for an object that may have uncontrolled movements.

Though, technology has further developed design of the gyroscopes to overcome the aforementioned problems, the gyroscopes may be complex, cumbersome and expensive to manufacture. Also, these gyroscopes generate complex algorithms and results which needs to be processed by a computer having higher processing capabilities. This complex result obtaining techniques may lead to expensive parts for manufacture of such gyroscopes and hence increases the overall costs of the system for which an orientation has to be determined.

The present disclosure is directed to overcome one or more limitations stated above or any other limitation associated with the conventional arts.

SUMMARY OF THE DISCLOSURE

One or more shortcomings of the prior art are overcome by a device as claimed and additional advantages are provided through the provision of device as claimed in the present disclosure. Additional features and advantages are realized through the aspects and techniques of the present disclosure. Other embodiments and aspects of the disclosure are described in detail herein and are considered a part of the claimed disclosure.

In one non-limiting embodiment of the present disclosure, a device for determining orientation of an object is disclosed. The device comprises of a housing configured with a plurality of sensors, wherein the plurality of sensors are provided on a surface of the housing. A light source is fixed within the housing, wherein the light source is configured to emit a continuous slow light beam on at least one sensor of the plurality of sensors at an initial position of the object, wherein, speed of the continuous slow light beam emitted on the at least one sensor of the plurality of sensors is less than the speed of light. The continuous slow light beam is configured to momentarily impinge on one or more of the plurality of sensors in the same or subsequent incident rays, when the object is displaced to a displaced position, such that, the difference in position between a reference sensor of the plurality of sensors and the one or more sensor of the plurality of sensors indicates the orientation of the object.

In an embodiment, each of the plurality of sensors are associated with a computing unit.

In an embodiment, the reference sensor is calibrated to continuously receive the continuous slow light beam when the object is not subjected to displacement.

In an embodiment, the plurality of sensors are activated when the continuous slow light beam impinges on them momentarily, to generate an input signal.

In an embodiment, the input signal from each of the plurality of sensors is transmitted to a computing unit, to determine orientation of the object, based on the impingement of the continuous slow light beam within the housing.

In an embodiment, the at least one light source emits the continuous slow light beam by at least one of a material dispersion method, a waveguide dispersion, or by using dispersion properties of planar waveguides method and the like.

In an embodiment, the computing unit indicates the orientation of the object in either of analog or digital form.

In an embodiment, the device is fastened to the object at a predefined location.

In an embodiment, the device determines the orientation of the object in pitch, yaw and roll axes.

In an embodiment, the shape of the housing is one of symmetrical shapes and asymmetrical shapes such as but not limiting to a cube, a cuboid and a sphere.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The novel features and characteristics of the disclosure are set forth in the description. The disclosure itself, however, as well as a preferred mode of use, further advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE DISCLOSURE

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that, the conception and specific embodiment disclosed may be readily utilized as a basis for modifying or designing other mechanism for carrying out the same purposes of the present disclosure. It should also be realized by those skilled in the art that such equivalent constructions do not depart from the scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The terms "comprises", "comprising", or any other variations thereof, are intended to cover a non-exclusive inclusion, such that an assembly, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relates in general relate to a device for determining the orientation of an object. More particularly, the present disclosure relates to a slow light-based orientation indication device for determining the orientation of the object. The device of the present disclosure may be employed in any type of vehicle or more particularly in aircrafts where there is sudden and quick change in direction or orientation of the vehicle.

Accordingly, the device may include a housing which is mountable on the object whose orientation is to be determined. The housing includes a light source that transmits a continuous slow light beam. The continuous slow light beam transmitted by the light source is particularly defined to comprise or emit a slower speed or velocity of continuous slow light beam when compared to the speed of light. Further, a plurality of sensors are positioned across the housing which are configured to receive the continuous slow light beam. A computing unit is provided in the device, and is disposed in communication with the plurality of sensors. When the object reorients based on its movement in pitch, roll or yaw axes, the continuous slow light beam will also reorient its path. The speed of the continuous slow light beam (3) is slower when compared with the speed of reorientation of the object. When the object reorients, the continuous slow light beam emitted proceeds along it's predetermined path and impinges on the reference sensor (S1), whereas the continuous slow light beam emitted just before the object reorients continues on it's original path and impinges on the other reference sensor (S2) hence activating it. The signal generated by the reference sensor (S2) can be pre programmed to associate with that particular orientation of the object and can be read as such by the computing unit (5) and displayed in either analog or digital form. The continuous slow light beam momentarily holds its position before retracing its path. At this moment the continuous slow light beam impinges on another of the plurality of sensors due to the faster movement of the housing in comparison with the continuous slow light beam. The computing unit receives the signals from the sensors onto which the continuous slow light beam impinges momentarily and the computing unit with the help of the incoming signals from the plurality of sensors depicts the orientation of the object.

Reference will now be made to the exemplary embodiments of the disclosure, as illustrated in the accompanying drawings. Wherever possible, same numerals will be used to refer to the same or like parts. The following paragraphs describe the present disclosure with reference to FIGS. 1 to 4.

Figure 1:
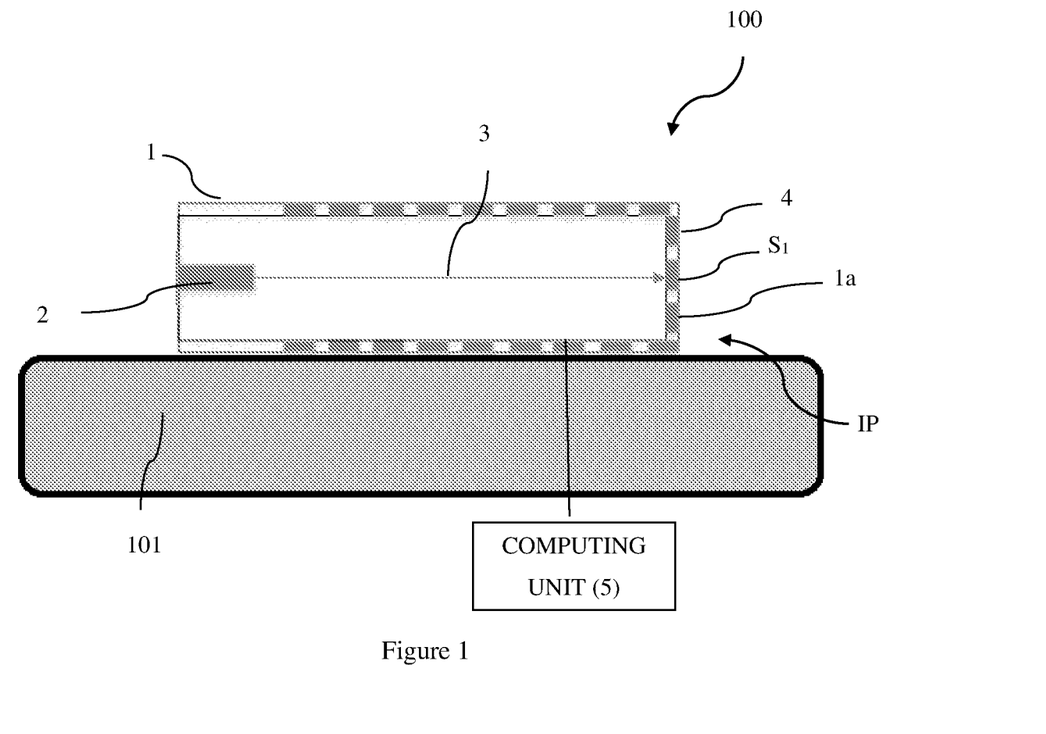
FIG. 1 illustrates a schematic view of a slow light-based orientation indication device, in accordance with an embodiment of the present disclosure.

FIG. 1 is an exemplary embodiment of the present disclosure, that illustrates a slow light-based orientation indication device (100) [hereinafter referred to as device (100)]. The device (100) is configured to determine the orientation of an object (101), even during rapid movement of the object (101).

The device (100) comprises a housing (1) mountable on the object (101), whose orientation is to be determined. The housing (1) includes at least one light source (2) fixed at one of the ends of the housing (1), wherein the at least one light source (2) is configured to transmit a continuous slow light beam (3). In an embodiment, the continuous slow light beam emitting out from the at least one light source (2) is a slow beam of light, i.e. the speed of the continuous slow light beam (3) transmitted by the at least one light source (2) is slow when compared with the speed of light. The continuous slow light beam (3) transmitted by the at least one light source (2) travels from one end of the housing (1) to the other end without any interruption. A plurality of sensors (4) are provided uniformly along the walls of the housing (1), for receiving the continuous slow light beam (3) transmitted by the at least one light source (2). The continuous slow light beam (3) impinging on one of the sensor or a reference sensor ($S_1$) of the plurality of sensors (4), activates the corresponding reference sensor ($S_1$). In general, the plurality of sensors (4) are calibrated to activate or deactivate based on the impingement of the continuous slow light beam (3). As and when the continuous slow light beam (3) is impinged on the plurality of sensors (4), they are adapted to generate a signal.

In an embodiment, the speed of the continuous slow light beam (3) may be designed to be emitted from a normal light source. The continuous slow light beam (3) from this light source may be slowed down within the housing (1) by material dispersion method or waveguide dispersion method or any other means which serves the purpose of slowing down the velocity/speed of the continuous slow light beam (3). Further, the plurality of sensors (4) are associated with a computing unit (5) for transmitting the signal upon receiving the continuous slow light beam (3). The reference sensor ($S_1$) may continuously be impinged by slow continuous slow light beam (3) when the object (101) is at an initial position (IP). The computing unit (5) is configured to determine orientation of the object (101), based on the signal received from the plurality of sensors (4).

Figure 2:
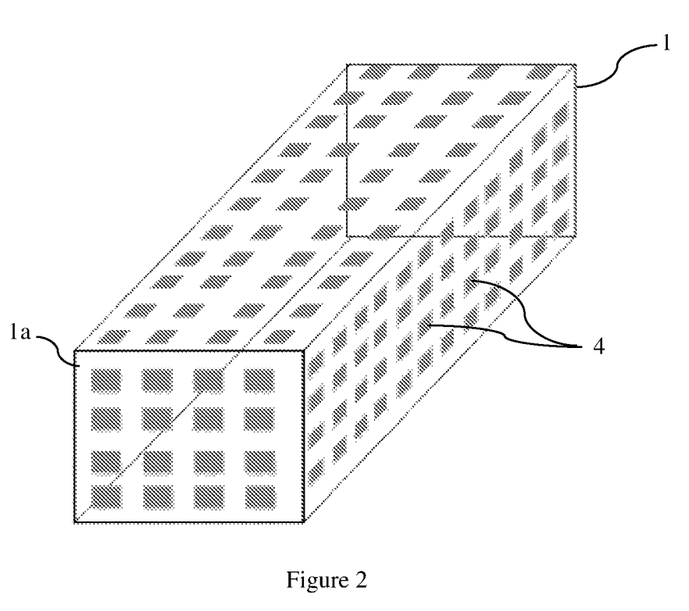
FIG. 2 illustrates a plurality of sensors provided within a housing of the slow light-based orientation indication device of FIG. 1.

FIG. 2 illustrates the housing (1) of the device (100). The housing (1) comprises of the plurality of sensors (4) positioned throughout the walls of the housing (1) at predetermined locations. In an embodiment, the plurality of sensors (4) are positioned on the housing (1) such that the distance between each of the plurality of sensors (4) may be equidistantly placed in each direction. The plurality of sensors (4) may be positioned on the inner walls or the outer walls of the housing (1) based on the material properties of the walls which are used to construct the housing (1). In an embodiment, the reference sensor ($S_1$) may be positioned within the housing (1) such that the incident continuous slow light beam (3) may be impinging on the reference sensor ($S_1$) when the object (101) is oriented at an initial position (IP).

In an exemplary embodiment, the plurality of sensors (4) are configured on the inner walls (la) of the housing (1) such that the walls are opaque and do not permit light to pass through them. However, if the walls of the housing (1) are made up of a transparent material then the plurality of sensors (1) may be configured on the outer walls of the housing (1).

Figure 3:
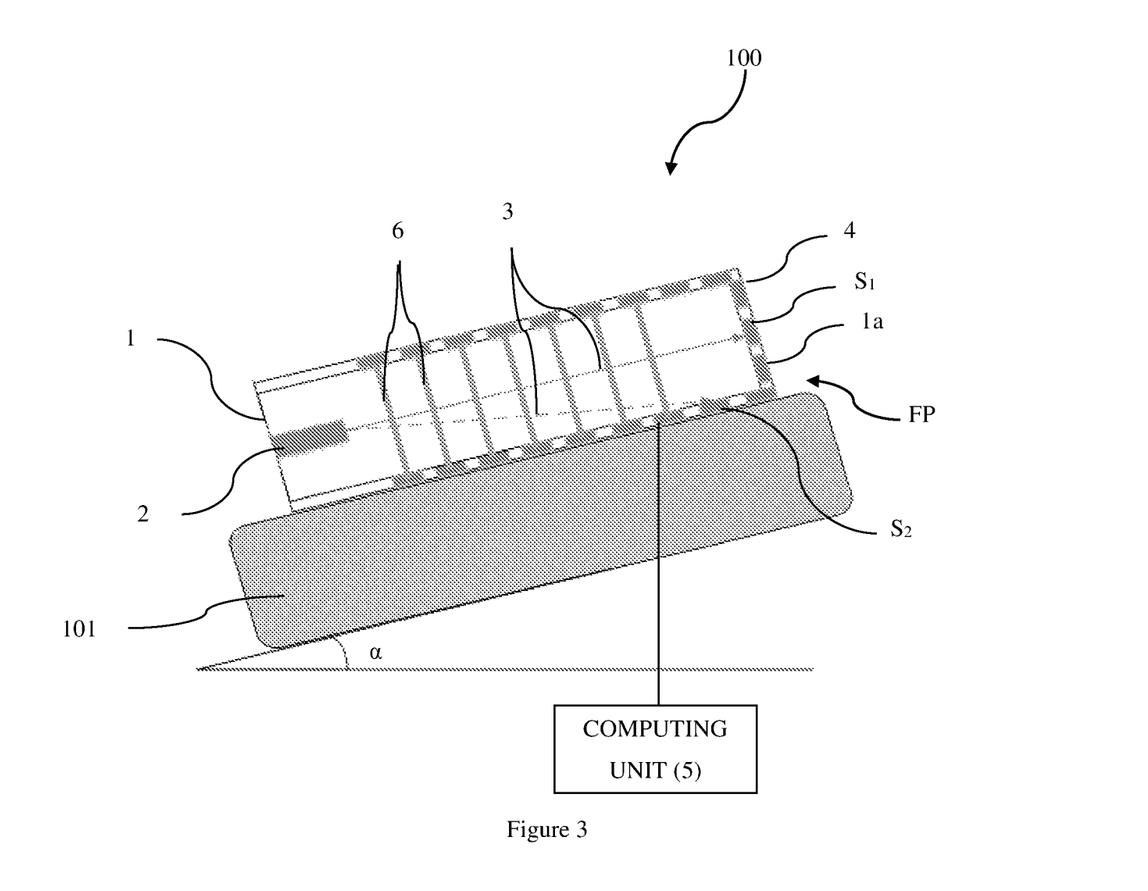
FIG. 3 illustrates a slow light-based orientation indication device of FIG. 1 which is employed with plurality of dampers for dampening the light within the housing.
Figure 4:
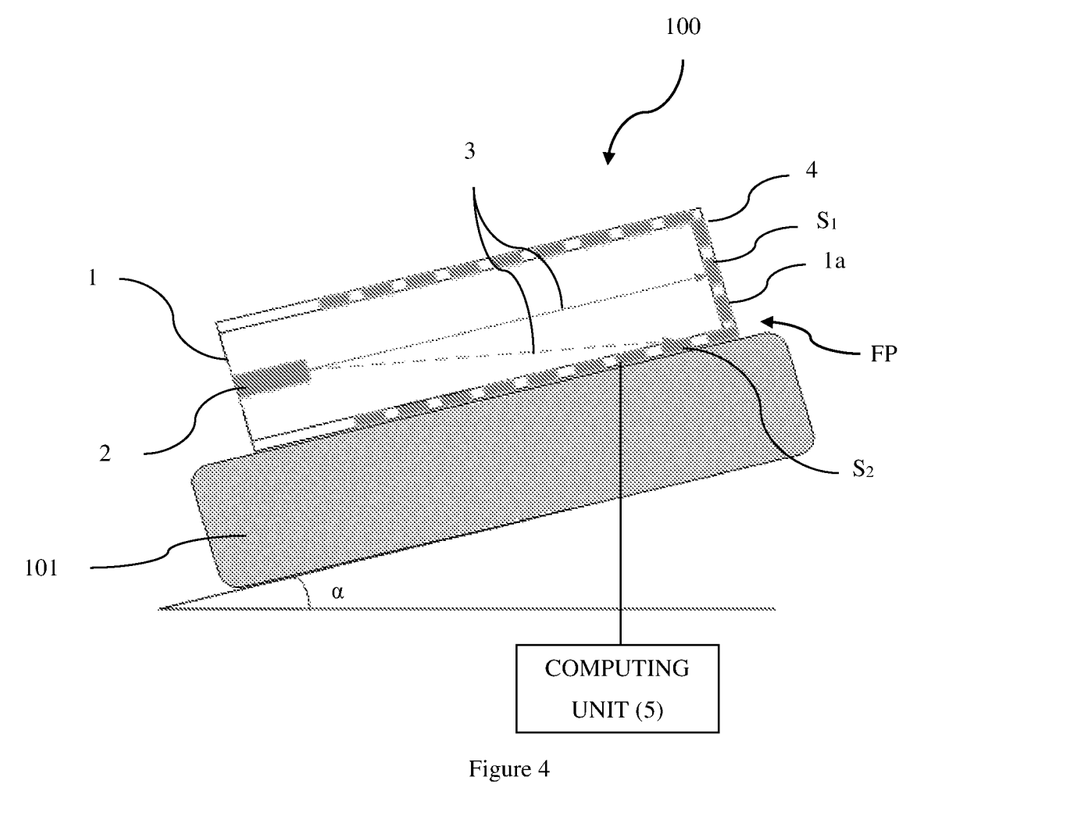
FIG. 4 illustrates another schematic view of the device for determining orientation in displaced position, in accordance with an embodiment of the present disclosure.

FIGS. 3 and 4 are exemplary embodiments of the present disclosure which illustrates the device (100) oriented to a displaced position (DP) rapidly, from an initial position (IP), wherein the angle between the initial position (IP) and the displaced position (DP) is indicated with an angle alpha (a). The object (101) when maneuvered, orients the device (100) from the initial position (IP) to the displaced position (DP).

When the device (100) is in the initial position (IP), the at least one light source (2) transmits the continuous slow light beam (3) whose speed is slowed down, and the continuous slow light beam (3) impinges on one of the plurality of sensors (4), i.e. the reference sensor ($S_1$), to activate the reference sensor ($S_1$). Subsequently, the reference sensor ($S_1$) transmits a signal to the computing unit (5). The computing unit (5), based on the signal received from the reference sensor ($S_1$), determines that there is no re-orientation of the object (101), since reading from only the reference sensor ($S_1$) is received. Thus, the computing unit (5) determines that the device (100) as well as the object (101) is in the initial position (IP).

When the object (101) rapidly moves in any of the plane of axes from the initial position (IP) to the displaced position (DP), the speed of the beam (3) being slower than the speed of manoeuvring of the object (101) will traverse the initial path of the original continuous slow light beam (3) and thereby impinge on another reference sensor ($S_2$). At this condition, the speed of the continuous slow light beam (3) is slower than the speed of re-orientation of the housing (1), therefore the continuous slow light beam (3) traverses the original path momentarily. The speed of the continuous slow light beam (3) is slower when compared with the speed of reorientation of the object. The continuous slow light beam emitted proceeds along it's predetermined path and impinges on the reference sensor (S1), whereas the continuous slow light beam emitted just before the object reorients continues on it's original path and impinges on the other reference sensor (S2) hence activating it. The signal generated by the reference sensor (S2) can be pre programmed to associate with that particular orientation of the object and can be read as such by the computing unit (5) and displayed in either analog or digital form. Thus, during rapid movement of the object (101) two of the reference sensors (S1 and S2) are activated by the continuous slow light beam (3) momentarily. Subsequently, the computing unit (5) receives the signals from the activated reference sensors (S1 and S2). Therefore, the computing unit (5), based on the signals from each of the plurality of sensors (4), determines orientation of the object (101).

In an embodiment, a fastening mechanism [not shown in Figures] may be provided in the housing (1), for mounting the housing (1) on the object (101).

In an embodiment, the fastening mechanism [not shown in Figures] is selected from at least one of a snap fit arrangement, a nut and bolt arrangement or any other fastening mechanism which serves the purpose of securely mounting the housing (1) on the object (101).

In an embodiment, shape of the housing (1) may be selected from at least one of a symmetrical shapes and asymmetrical shapes such as but not limiting to a square shape, a circular shape, a rectangular shape, cube, cuboid, sphere or any other shapes, which serves design feasibility and requirement. In an exemplary embodiment, shape of the housing (1) is cuboid.

In an embodiment, the housing (1) may be a hollow structure or may include a material defined by a predetermined refractive index value conducive to maintaining the speed of the continuous slow light beam (3), as emitted by the source (2), at a speed slower than that of light. In another embodiment, the housing (1) may be manufactured of a material which serves the purpose of slowing down the continuous slow light beam (3) transmitted by the at least one light source (2).

In an embodiment, the housing (1) may include a plurality of dampers (6) [shown in FIG. 3] provided along the length of the housing (1), wherein the plurality of dampers (6) are configured to reduce speed of the continuous slow light beam (3) transmitted by the at least one light source (2). In an embodiment, each of the plurality of dampers (6) may be a polarizer configured to slow down speed of the continuous slow light beam (3) transmitted by the at least one light source (2).

In an embodiment, the housing (1) may be filled with a fluid [not shown in figures] through which the continuous slow light beam (3) is transmitted so that the speed of the continuous slow light beam (3) is maintained at a speed slower than that of light.

In an embodiment, the at least one light source (2) may be selected such that, the intensity of the continuous slow light beam (3) transmitted within the housing (1) has minimal scattering.

In an embodiment, source of the continuous slow light beam may be selected from at least one of light emitting diodes, electric discharge sources, incandescence sources, luminescence sources or any other light sources which serves the purpose.

In an embodiment, the speed of the continuous slow light beam (3) may be slowed down by utilizing a microchip or a semiconductor or any other mechanism in the housing (1).

In an embodiment, a plurality of dampers (6) [as shown in FIG. 3] may be provided along the path of the continuous slow light beam (3), to slow down the continuous slow light beam (3) as per design feasibility and requirement.

In an embodiment, the plurality of sensors (4) is selected from at least one of a photovoltaic sensor, piezoelectric sensor or any other sensor, which serves the purpose of receiving the modulated/low velocity continuous slow light beam (3) and providing a signal. In an exemplary embodiment, the plurality of sensors (4) may be an optical sensor.

In an embodiment, the computing unit (5) may include an I/O interface, a memory a processor [not shown in Figures]. The I/O interface may be adapted to receive input data from the plurality of sensors (4). The data received by the I/O interface may be stored in the memory, which may be utilized by the processor for determining the orientation of the object (101). The memory may also include computational instructions for determining the orientation of the object (101).

In an embodiment, the plurality of sensors (4) transmits the signal to the computing unit (5) by at least one of wireless communication means or wired communication means, as per design feasibility and requirement.

In an embodiment, the computing unit (5) may determine orientation of the object (101) based on the angle subtended between the position of each of the plurality of sensors (4) i.e. between the reference sensors ($S_1$ and $S_2$).

In an embodiment, the speed of manoeuvring of the object (101) may be greater that speed of travel of the continuous slow light beam (3) within the housing (1). In an exemplary embodiment, if the speed of the continuous slow light beam (3) is 10 m/s, then the speed of manoeuvring of the object (101) is 15 m/s.

In an embodiment, apart from the continuous slow light beam, alternative sources such as sound waves or sound wave propagation may be used as the source to determine orientation of the object (101).

In an embodiment, the device (100) is configured to determine pitch, roll and yaw, based on the signal received from the plurality of sensors (4).

Advantages:

The present disclosure provides a device for determining the orientation of the object, which is configured to determine orientation of the object in 3-dimensions, even during rapid manoeuvring of the object.

The present disclosure provides the device for determining the orientation of the object, which is cost effective and simple in construction and operation. Additionally, the device may function in space, where there is no action of gravity.

The present disclosure provides the device for determining the orientation of the object, which utilises simple computations for determining orientation of the object.

The present disclosure provides the device for determining the orientation of the object, which is configured to compute parameters pertaining to orientation of the object in all the three axes. Thus, need for separate devices to compute orientation parameters along each of the axes are mitigated.

EQUIVALENTS

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the particular features of this disclosure, it will be appreciated that various modifications can be made, and that many changes can be made in the preferred embodiments without

REFERRAL NUMERALS

| Reference Number | Description |
|---|---|
| 100 | Device |
| 101 | Object |
| 1 | Housing |
| 1a | Inner wall of the housing |
| 2 | Light source |
| 3 | continuous slow light beam |
| 4 | Plurality of sensors |
| 5 | Computing unit |
| 6 | Plurality of dampers |
| $S_1, S_2$ | Reference sensors |
| IP | Initial position |
| DP | Displaced position |

The invention claimed is:

1. A device (100) for determining orientation of an object (101), the device (100) comprising:
a housing (1) configured with a plurality of sensors (4), wherein the plurality of sensors (4) are provided on a surface of the housing (1);
at least one light source (2), fixed within the housing (1), wherein the at least one light source (2) is configured to emit a continuous light beam (3) on at least one sensor of the plurality of sensors (4) at an initial position (IP) of the object (101), wherein, speed of the continuous light beam (3) emitted on the at least one sensor of the plurality of sensors (4) is less than a speed of light; and
wherein, the continuous light beam (3) is configured to momentarily impinge on one or more of the plurality of sensors (4) in the same or subsequent incident rays, when the object (101) is displaced to a displaced position (DP), such that, the difference in position between a reference sensor ($S_1$) of the plurality of sensors (4) and the one or more sensor ($S_2$) of the plurality of sensors (4) indicates the orientation of the object (101).

2. The device (100) as claimed in claim 1, wherein each of the plurality of sensors (4) are associated with a computing unit (5).

3. The device (100) as claimed in claim 1, wherein the reference sensor ($S_1$) is calibrated to continuously receive the continuous light beam (3) when the object (101) is not subjected to displacement.

4. The device (100) as claimed in claim 1, wherein the plurality of sensors (4) are activated when the continuous light beam (3) impinges on them momentarily, to generate an input signal.

5. The device (100) as claimed in claim 4, wherein the input signal from each of the plurality of sensors (4) is received by a computing unit (5), to determine orientation of the object (101), based on the impingement of the continuous light beam (3) within the housing (1).

6. The device (100) as claimed in claim 1, wherein the at least one light source (2) emits the continuous light beam (3) by at least one of a material dispersion method, a waveguide dispersion method, or by using dispersion properties of planar waveguides and the like.

7. The device (100) as claimed in claim 2, wherein the computing unit (5) indicates the orientation of the object (101) in at least one analog form and digital form.

8. The device (100) as claimed in claim 1, wherein the device (100) is fastened to the object (101) at a predefined location.

9. The device (100) as claimed in claim 1, wherein the device (100) determines the orientation of the object (101) in pitch, yaw and roll axes.

10. The device (100) as claimed in claim 1, wherein the shape of the housing (1) is one of symmetrical shapes and asymmetrical shapes such as but not limiting to a cube, a cuboid and a sphere.

* * * * *